(12) United States Patent
Eder et al.

(10) Patent No.: US 8,388,273 B2
(45) Date of Patent: Mar. 5, 2013

(54) METAL CUTTING TOOL AND CUTTING PLATE PROVIDED IN THE SHAPE OF A DONUT

(75) Inventors: Otto Eder, Kongen (DE); Wolfgang Zitzlaff, Kirchhelm/Teck (DE)

(73) Assignee: CeramTec GmbH, Plochingen (DE)

( * ) Notice: Subject to any disclaimer, the term of this patent is extended or adjusted under 35 U.S.C. 154(b) by 347 days.

(21) Appl. No.: 11/528,788

(22) Filed: Sep. 28, 2006

(65) Prior Publication Data
US 2007/0160432 A1 Jul. 12, 2007

Related U.S. Application Data

(63) Continuation of application No. 10/483,886, filed as application No. PCT/DE02/02665 on Jul. 19, 2002, now abandoned.

(30) Foreign Application Priority Data
Jul. 26, 2001 (DE) .................................. 101 36 635

(51) Int. Cl.
B23B 27/16 (2006.01)
B26D 1/00 (2006.01)

(52) U.S. Cl. ........................ 407/107; 407/109
(58) Field of Classification Search ................. 407/107, 407/108, 109, 110, 41, 46, 113, 48, 40, 53, 407/103, 33, 34, 64, 35
See application file for complete search history.

(56) References Cited

U.S. PATENT DOCUMENTS

| | | | |
|---|---|---|---|
| 2,031,334 A | 2/1936 | Severson | |
| 3,731,356 A | 5/1973 | Gowanlock | |
| 4,277,207 A | 7/1981 | Prouix | |
| 4,321,846 A | 3/1982 | Neamtu | |
| 4,395,168 A | 7/1983 | Vicari | |
| 4,477,212 A | 10/1984 | Kraft | |
| 4,480,950 A | 11/1984 | Kraft et al. | |
| 4,552,491 A | 11/1985 | Parker | |
| 4,600,341 A | 7/1986 | Board | |
| 4,697,963 A | 10/1987 | Luck | |
| 4,938,639 A | 7/1990 | Lockard | |
| 5,076,738 A | 12/1991 | Pano et al. | |
| 5,197,831 A | 3/1993 | Shiratori et al. | |
| 5,207,748 A | 5/1993 | Katbi et al. | |
| 5,477,754 A | 12/1995 | Herbon | |
| 5,658,100 A | 8/1997 | Deiss et al. | |
| 5,733,073 A | 3/1998 | Zitzlaff et al. | |
| 5,820,311 A * | 10/1998 | Grun et al. | 407/102 |
| 5,836,723 A | 11/1998 | Von Haas et al. | |
| 5,944,457 A | 8/1999 | Tjernstrom | |
| 6,053,671 A | 4/2000 | Stedt et al. | |
| 6,146,062 A * | 11/2000 | Jansson | 407/107 |
| 6,176,649 B1 | 1/2001 | Friedman | |

(Continued)

FOREIGN PATENT DOCUMENTS

| | | |
|---|---|---|
| DE | 1602817 | 5/1970 |
| DE | 19854873 A1 | 5/2000 |

(Continued)

*Primary Examiner* — Will Fridie, Jr.
(74) *Attorney, Agent, or Firm* — Fulbright & Jaworski, L.L.P.

(57) ABSTRACT

A metal cutting tool has a supporting tool, which has a recess for accommodating a cutting plate. The cutting plate is provided with a clamping trough, which is held in the supporting tool by a clamping claw. The clamping claw is fixed against the supporting tool by a clamping screw. A pressure piece is placed on the clamping claw and its underside facing the cutting plate is provided with a cam, which is in contact with the clamping trough and the clamping claw pulls the pressure piece toward the clamping screw.

4 Claims, 6 Drawing Sheets

U.S. PATENT DOCUMENTS

| | | |
|---|---|---|
| 6,217,264 B1 | 4/2001 | Kim et al. |
| 6,224,300 B1 | 5/2001 | Baxivanelis et al. |
| 6,394,709 B1 | 5/2002 | Sjoo et al. |
| 6,682,273 B2 | 1/2004 | Sjoo et al. |
| 7,073,986 B2 * | 7/2006 | Andras ................. 407/113 |
| 2004/0256608 A1 | 12/2004 | Eder et al. |

FOREIGN PATENT DOCUMENTS

| | | |
|---|---|---|
| EP | 0 753 366 A | 1/1997 |
| GB | 1 567 004 A | 5/1980 |
| JP | 2000 117512 A | 4/2000 |

* cited by examiner

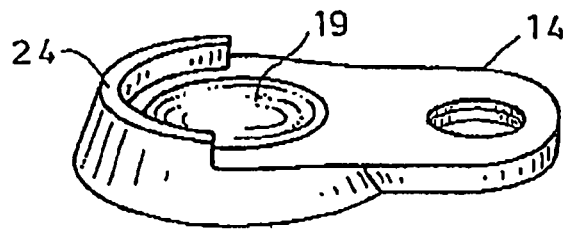
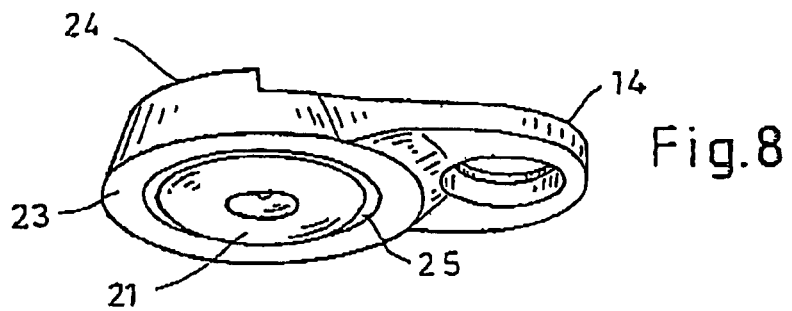
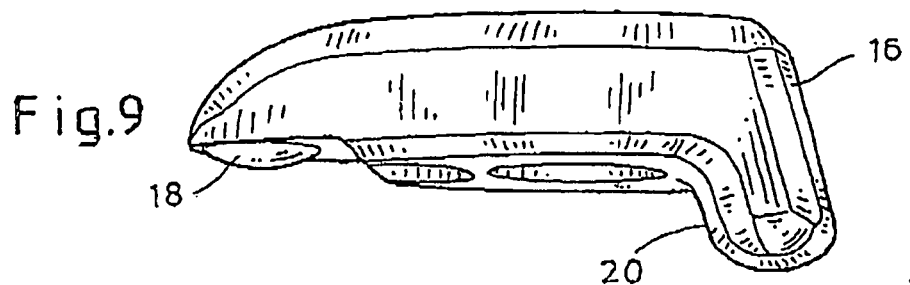
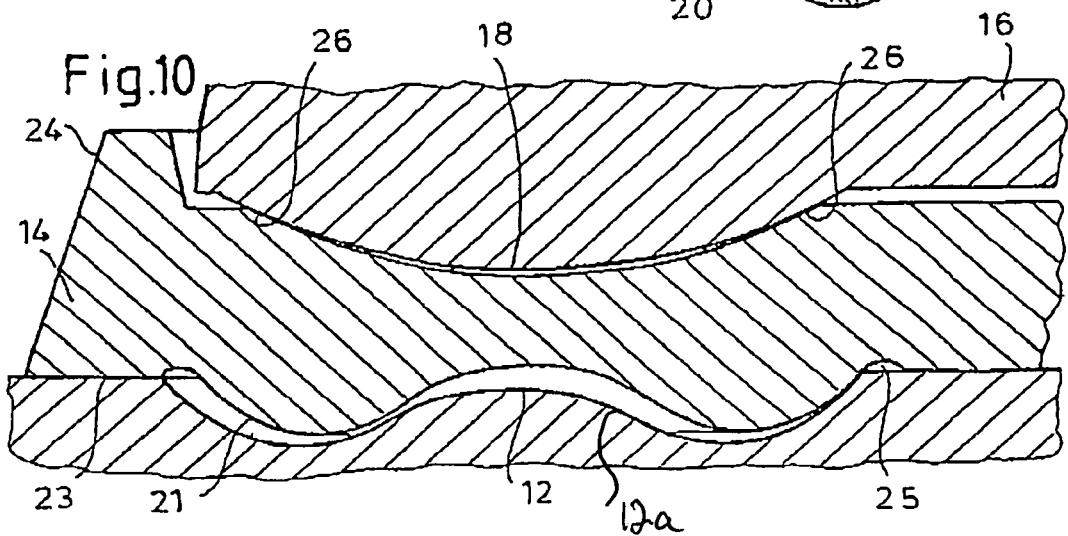

METAL CUTTING TOOL AND CUTTING PLATE PROVIDED IN THE SHAPE OF A DONUT

This application is a continuation application of U.S. Ser. No. 10/483,886 filed Jun. 10, 2004 now abandoned incorporated by reference in its entirety, which is a §371 of PCT/DE02/02665 filed Jul. 19, 2002, which claims priority from German Patent Application No. 101 36 635.3 filed Jul. 26, 2001 and German Patent Application No. 102 08 266.9 filed Feb. 26, 2002.

The invention relates to a metal-cutting tool and an associated cutting plate.

The prior art for a cutting insert, here an indexable cutting plate made of ceramic material, is constituted by cutting plates that have a smooth surface or that have a great variety of clamping troughs and are inserted so as to be clamped in a supporting tool for the purpose of machining metallic materials. The disadvantage of this technology in the case of smooth cutting plate surfaces is the lack of a form-locking connection with the supporting tool with respect to the clamping force. In the case of cutting plates that have a clamping trough admittedly there is in addition a form-locking connection, but as a result of the clamping in the clamping trough the cutting plate is loaded by the clamping elements in terms of force to a very great extent over a comparatively small area, something which can lead to stresses in the cutting plate or even breakages. Furthermore, in the case of the clamping systems that exist today not all the possible positive factors are combined in one system.

A metal-cutting tool, substantially consisting of a supporting tool which has a recess to accommodate a cutting plate that is provided with a clamping trough held in the supporting tool by a clamping claw, the clamping claw being fixed on the supporting tool by way of a clamping screw, is known from EP 0 753 366 B1. Arranged on the clamping claw there is a pressure piece which, on the underside facing the cutting plate, is provided with a cam which is in tight contact with the clamping trough. Furthermore, the clamping claw pulls the pressure piece in the direction of the clamping screw.

SUMMARY OF THE INVENTION

The underlying object of the invention is to combine, by means of simple components, as many positive factors in one system as possible and to achieve an optimum clamping situation as a result of the cooperation thereof. In this connection, the manufacturing tolerances of the various components are to be compensated for, an additional form-locking connection with controlled clamping-force limitation is to result, and a configuration of the component parts that counteracts the machining forces is to be used as a basis for avoiding a loss of clamping force during use.

In accordance with the invention this object is achieved according to the present invention.

In accordance with the invention, the clamping trough is formed in a circular shape and in the center has a spherical or circular elevation. The cam on the pressure piece consists of a circular ring that is adapted thereto and tightly engages into the clamping trough whilst surrounding the elevation. As a result an optimum fit of the cutting plate in the supporting tool is guaranteed.

In an advantageous development, the clamping claw has on its underside located above the pressure piece a spherical elevation which engages into a spherical depression on the pressure piece.

In this connection, the radius of the spherical elevation on the clamping claw is advantageously greater than the radius of the spherical depression in the pressure piece, as a result of which a transmission of force can be effected by way of the outer edges.

The pressure piece is preferably secured to the clamping claw with clearance by a way of a screw.

In order to protect the clamping claw from impinging filings, expediently the pressure piece has a raised part on the front side.

The pressure piece preferably consists of a wear-resistant material, such as hard metal, HSS or ceramic material.

In a preferred development, an open region centrically or concentrically surrounds the ring on the pressure piece, and this open region is centrically or concentrically surrounded by a bearing surface that rises towards the center of the ring at an angle.

The clamping claw is advantageously guided on the supporting tool by way of an incline with a form of clamping-force limitation.

In an alternative embodiment, the clamping claw is guided on the supporting tool by way of two inclines, with the two inclines extending in parallel and being separated from each other by way of a slit.

The two inclines advantageously extend at an angle of 10° to 45° in relation to the longitudinal axis of the clamping claw.

Advantageously, the two inclines have a cylindrical surface, and the supporting tool has cylindrical lateral surfaces adapted thereto.

A cutting plate in accordance with the invention is provided with a clamping trough, with the clamping trough being formed in a circular shape and having a spherical or circular elevation in the center and being capable of being installed in the cutting tool that has been described.

The formation as an indexable cutting plate is advantageous.

BRIEF DESCRIPTION OF THE DRAWINGS

Further features of the invention emerge from the figures which are described in the following and in which:

FIG. 7 shows a view of the upper side of a pressure piece;

FIG. 8 shows a view of the underside of a pressure piece;

FIG. 9 shows a view of a clamping claw; and

FIG. 10 shows an enlarged section of the clamping claw, the pressure piece and the cutting plate.

DETAILED DESCRIPTION OF PREFERRED EMBODIMENT

Figure 1:
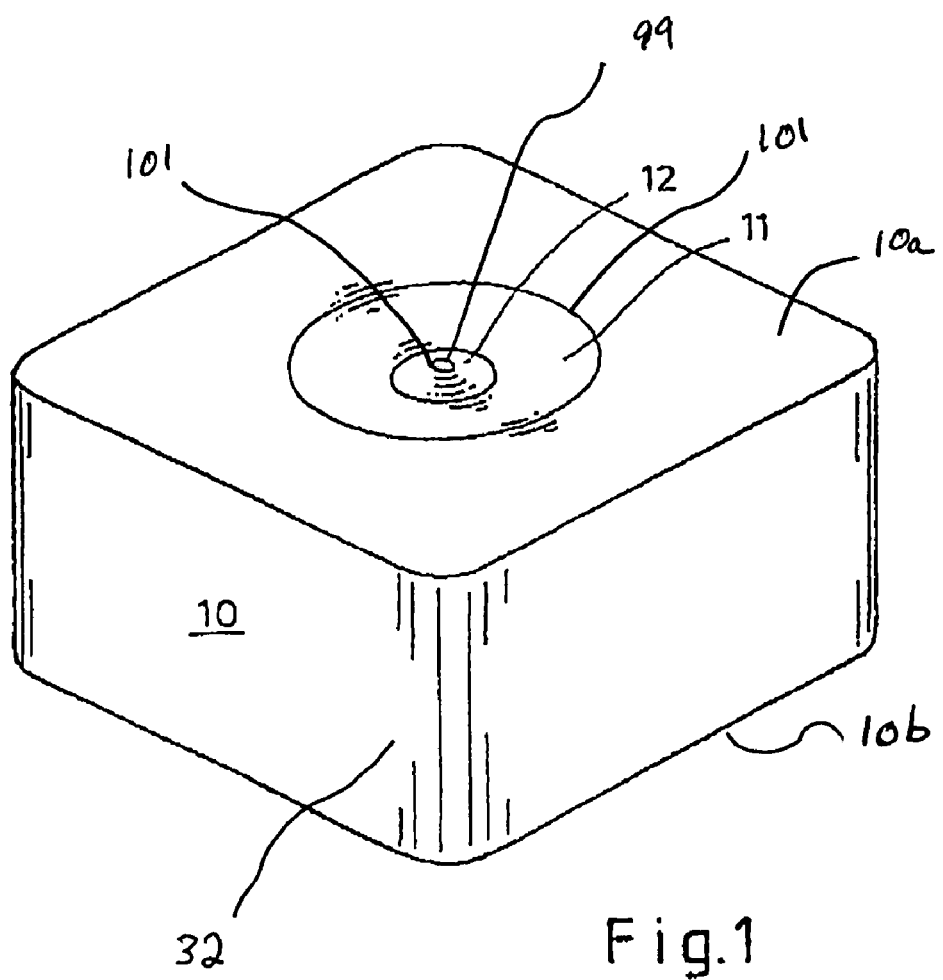
FIG. 1 shows a view of a cutting plate in accordance with the invention.

FIG. 1 shows a cutting insert or a cutting plate 10 as an indexable cutting plate for the metal-removing processing of metallic work pieces. Cutting plate 10 has a top surface 10a and a bottom surface 10b. As can be seen in FIG. 1, top surface 10a terminates at cutting edge 32. The cutting plate 10 has in the center and positioned away from a cutting edge 32 of cutting plate 10 a circular clamping trough 11, with there being positioned in turn in the center of the latter a spherical or circular elevation 12. This clamping trough 11 and elevation 12 are to be used to fix the cutting plate in an appropriate receiver, here called a plate seat 104, on a suitable supporting tool. In FIG. 1 elevation 12 does not have a center hole. Clamping trough 11 on the top surface 10a extends into cutting insert 11 at a first outer diameter 101 and terminates at the first clamping trough bottom 11b.

Figure 2:
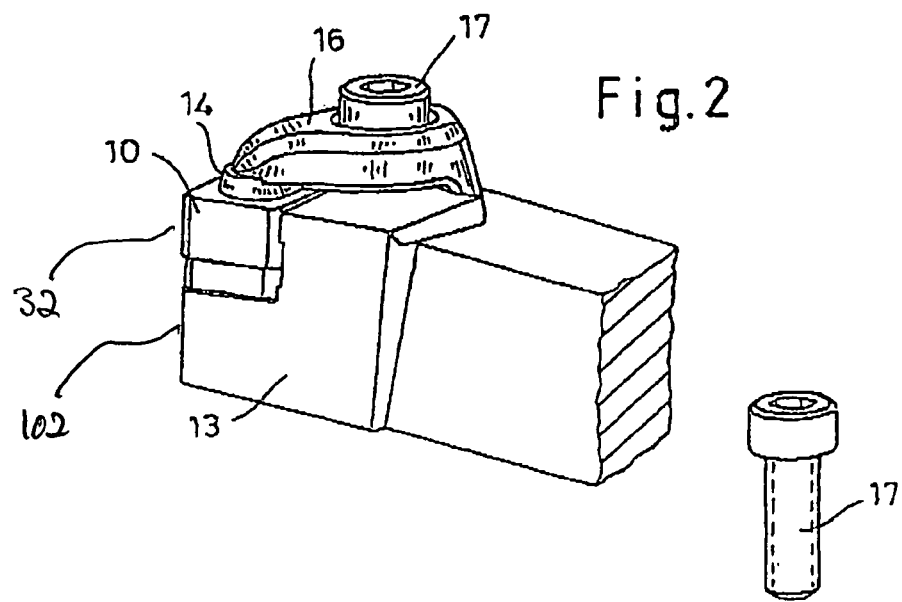
FIG. 2 shows a view of the cutting tool with the cutting plate inserted.
Figure 3:
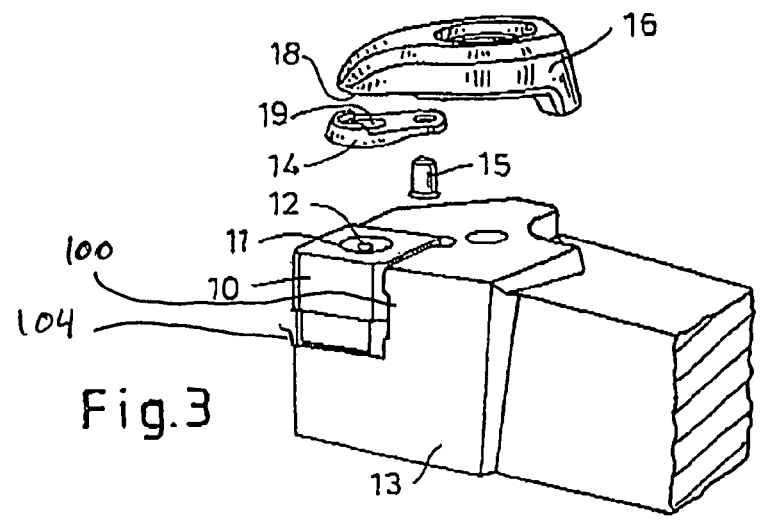
FIG. 3 shows the cutting tool in accordance with FIG. 2 in an exploded view.
Figure 4:
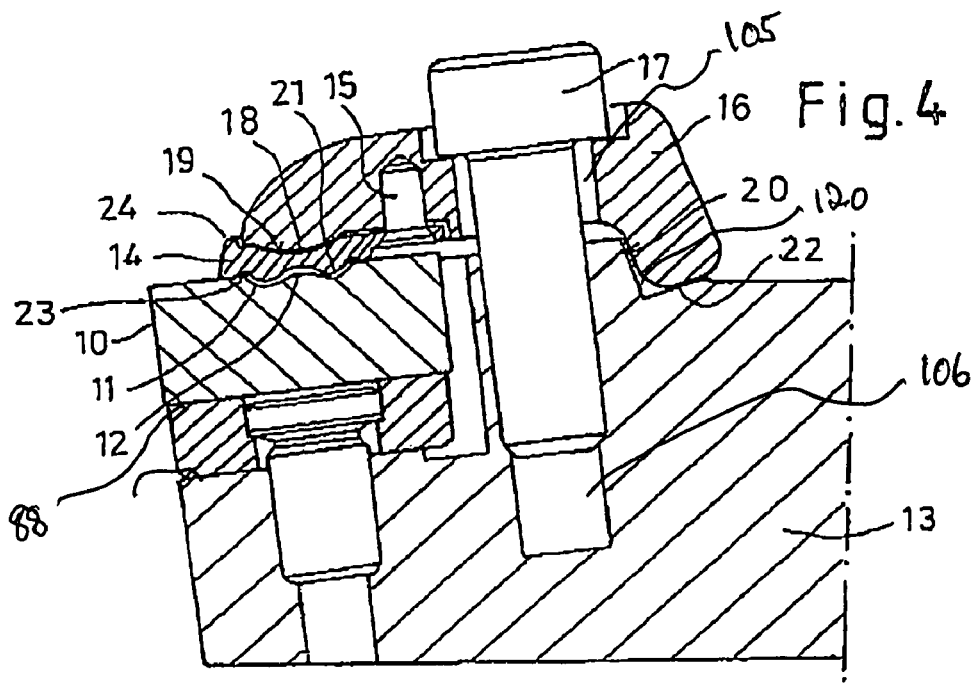
FIG. 4 shows the cutting tool in accordance with FIG. 2 in section.

FIG. 2 shows the spatial representation of the cutting plate 10 that has been described in the clamped state on a supporting tool 13. Special attention is to be given in this connection to the pressure piece 14 (see also FIG. 3) which on the underside has the counter-form of the clamping trough in the cutting plate previously described. The clamping force that develops as a result of tightening the clamping screw 17 is transferred by way of the clamping claw 16 to the cutting plate 10. As a special feature, the clamping claw has, on the underside 89 located above the cutting plate, a spherical elevation 18 which projects into a spherical depression 19 in the pressure piece 14 and is secured with clearance by means of the screw 15. Plate seat 104 is provided at a forward end 102 of supporting tool 13 and has side wall 100 for receiving cutting insert 10 and a bottom wall 88. Clamp claw 16 has an aperture 105 therethrough for receiving clamping screw 17. Supporting tool 13 includes an internally threaded clamp securing bore 106 as shown in FIG. 4 formed between an inclined surface 120 of supporting tool 13 and plate seat 104. The angle between the inclined surface of the tool holder and the inclined surface of the clamp is different that the angle between the elevation and the bore of the tool holder.

A cross section through the plate seat is shown in FIG. 4 in which the cooperation of the clamping elements shall be described. When tightening the clamping screw 17, the clamping claw 16 moves downwards and at the same time slides backwards with the incline 20 on a similar incline 120 in the supporting tool. Since the clamping claw by way of the spherical elevation 18 on the side lying opposite the incline and as a result of the clamping force that develops is connected to the pressure piece 14 in a form-locking manner by means of the spherical depression 19, and since the elevation 21 of the pressure piece in turn engages in a form-locking manner into the trough 11 of the cutting plate, the movement that is directed sideways into the plate-seat corner is transferred by means of the individual clamping elements to the cutting plate. Clamp contour portion 26 is also provided and formed from walls of elevation 21. See also in this connection FIG. 10. When the clamping-force limitation 22 is reached, the lever movement of the clamping claw is increased. The pressure piece 14 exerts an even greater pressure on the cutting plate and now also additionally presses with its bearing surface 23 on the top surface 10a of the cutting plate. The outstanding feature of this cooperation is that with the combination of all the elements the cutting plate is no longer able to move out from its plate seat as a result of the forms and inclines that are provided. As can be seen in FIG. 4, inclined surface 120 of support tool 13 is at an angle with respect to the elevation of the cutting insert. Incline 20 of clamp is formed at a proximal end of the clamp and has approximately the same prescribed angle as the inclined surface 120 of the tool.

Figure 5:
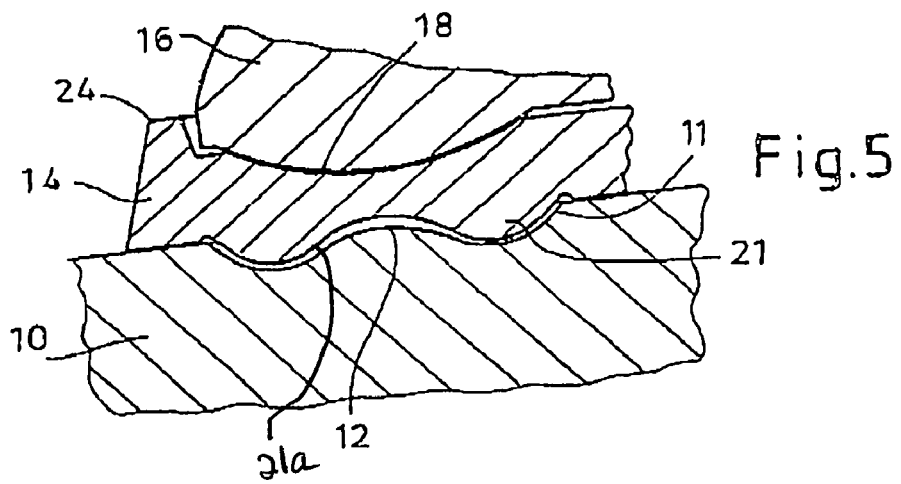
FIG. 5 shows an enlarged view of the cooperation between the clamping claw, the pressure piece and the cutting plate.

FIG. 5 again shows an enlarged view of the cooperation of the clamping claw, the pressure piece and the cutting plate.

Figure 6:
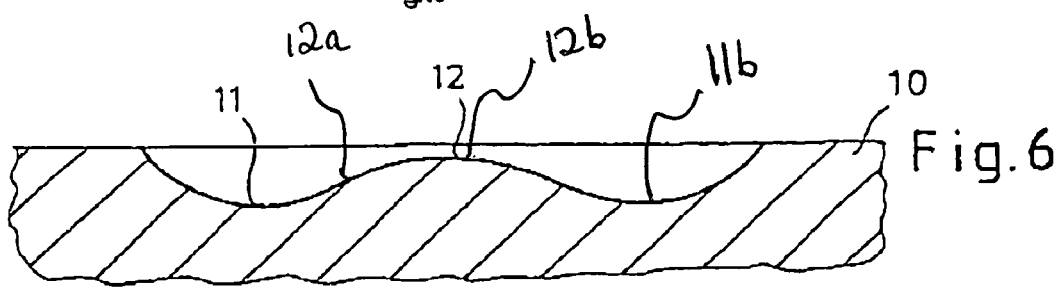
FIG. 6 shows a section through a clamping trough.

FIG. 6 shows a section through the circular trough 11 of the cutting plate. The clamping trough is centrally disposed in the top surface 10a. The clamping trough on the top surface extends into the cutting insert at a first outer diameter and terminates at the first clamping trough bottom. The clamping trough on the top surface extends into the cutting insert at an outer diameter and terminates at the first clamping trough bottom. Elevation 12 is centrally disposed within the first dimple bottom, the first elevation has an outer shape that extends from the trough bottom to the top surface 12b of elevation 12 to form elevation wall 12a. Elevation wall 12a is formed by extending the elevation wall vertically from the trough bottom and terminates elevation surface 12b. In FIG. 1 the outer shape of elevation 12 is circular. In the center of the latter can be seen the circular or spherical elevation 12. A special feature in this connection is that the elevation 12 has the shape of a sphere and lies above the trough base and below the cutting plate surface 10a. Thus, the elevation has an elevation surface 12b that is on a plane lower than that of the top surface 10a of cutting plate 10. Elevation 12 has a wall 12a and a surface 12b. The trough contour is circular in cross section and runs as it were about the perpendicular axis of the sphere, this being reminiscent of the baking tin of the American donut.

The upper side of the pressure piece 14, which has as a special feature the described spherical indentation 19 or spherical hollow or depression, is shown in FIG. 7.

The underside of the pressure piece 14 which has, as a special feature, an elevation 21, a donut shape, which is the counter-form of the clamping trough on the cutting plate, is shown in FIG. 8. Additional features are the bearing surface 23, which rises at an angle towards the center of the donut, and the open region 25 which is to protect the trough edge of the cutting plate from surface contact and thus damage and insufficient seating. See also in this connection FIG. 10.

A further special feature of the pressure piece is its constitution, being made from a wear-resistant material, such as hard metal, HSS or ceramic material, and the raised part 24 of the outer contour to protect the clamping claw from the filings which are formed during machining (see FIG. 7). The sphere/spherical-indentation connection is also used for tolerance—and position-compensation between the clamping element and the cutting plate.

FIG. 9 shows the underside of the clamping claw with the spherical elevation 18 which has been described. A special feature of this sphere is, moreover, the fact that the diameter of the sphere is somewhat greater than the diameter of the spherical indentation in the pressure piece 14 in order to enable there to be transmission of force by way of the sphere/spherical-indentation outer edges 26, see FIG. 10, and not by way of punctiform loading at the spherical-indentation base and the tip of the sphere. A further feature is the incline 20 on the clamping claw (see FIG. 4 and FIG. 9) which guides by way of an incline in the supporting tool. These inclines have the effect that when tightening the clamping screw a lateral movement of the clamping elements is effected that is to pull the cutting plate into the corner of the plate seat. This clamping claw is intended for supporting tools that have comparatively small dimensions.

Figure 11:
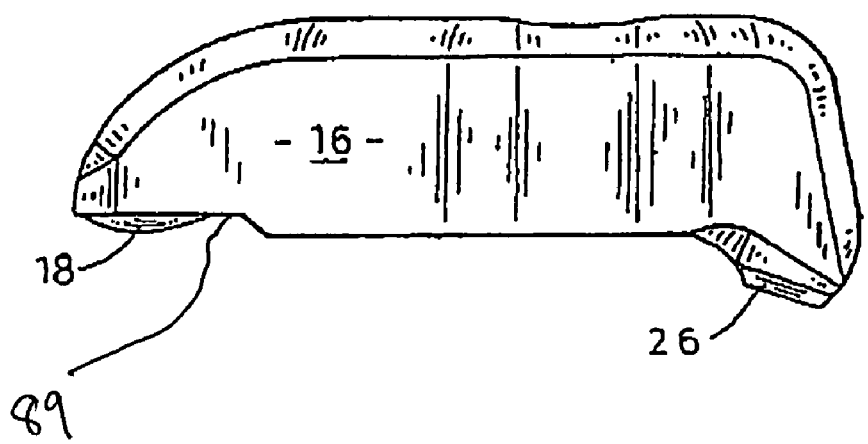
FIG. 11 shows the underside of a further variant of the clamping claw.
Figure 12:
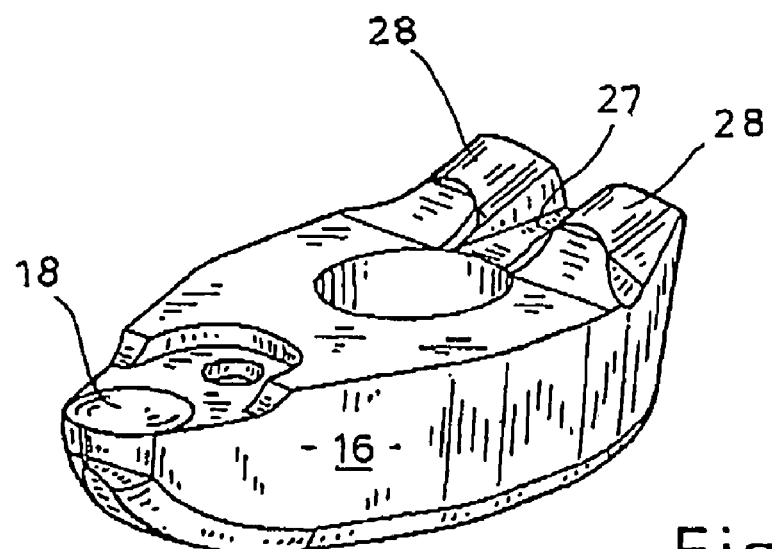
FIG. 12 shows a slit in the clamping jaw.

FIG. 11 shows the underside of a further variant of the clamping claw 16 with the spherical elevation 18 that has been described. This clamping claw 16 is intended for supporting tools whose dimensions permit the installation of this element which is comparatively large on account of its manner of construction. A special feature of this clamping claw is the incline 26 which is shaped differently in the rear region in comparison with that in FIG. 9. It extends, as can be seen in FIG. 12, separated by a slit 27, at an angle of 10° to 45°. The inventive feature of these two inclines 26 is provided by their cylindrical surfaces 28. These have the effect that when tightening the clamping screw in addition to the lateral movement of the clamping claw self-centering in a recess 29 specifically produced therefor is effected on the corresponding supporting tool 13. See in this connection FIG. 13.

Figure 13:
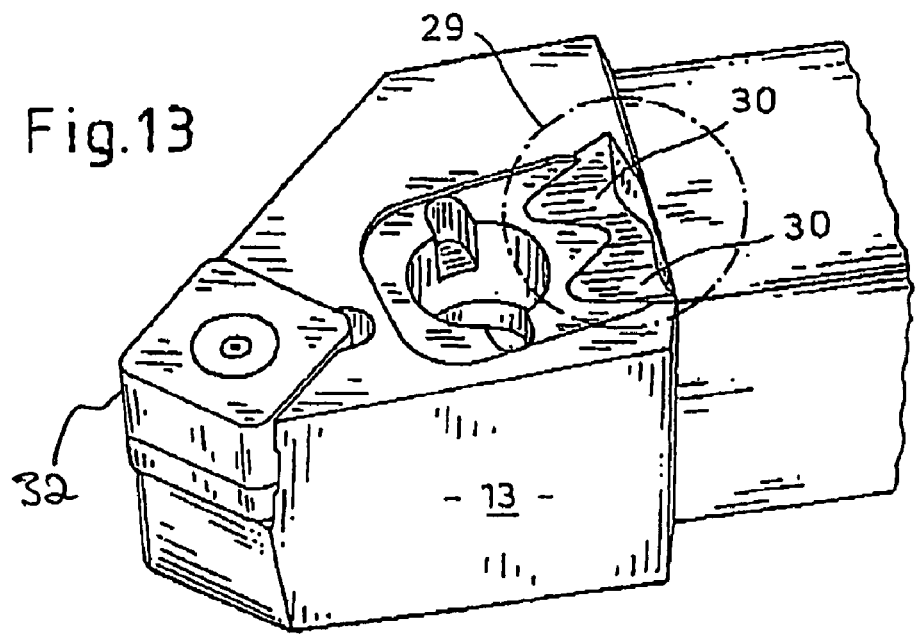
FIG. 13 shows the cylindrical surface o the two inclines.
Figure 14:
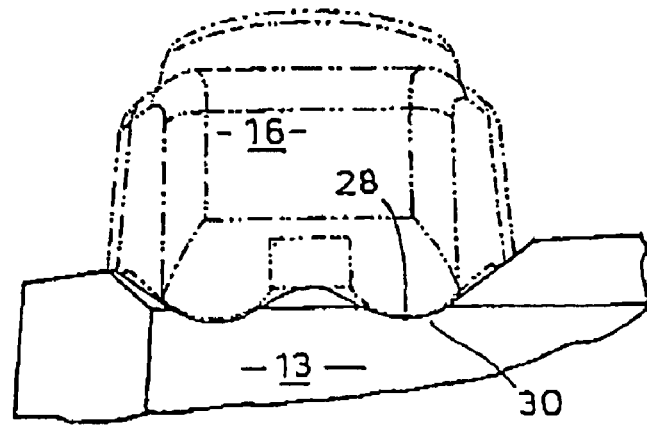
FIG. 14 shows the cooperation of the clamping claw and the supporting tool cross section.

The special feature of the recess 29 on the supporting tool 13 in FIG. 13 is in turn the cylindrical surface of the two inclines 30 which extend in parallel and the radius of which is designed so as to be somewhat greater than the cylindrical surfaces 28 of the clamping claw. This consequently renders possible an approximate line contact between the inclines and a self-centering sliding movement along the contacting lateral cylinder surfaces 28 and 30. FIG. 14 shows this cooperation of the clamping claw and the supporting tool in cross section.

The invention claimed is:

1. A metal-cutting tool comprising
a supporting tool which has a recess to accommodate a cuttin insert comprising a clamping trough held in the supporting tool by a clamping claw, wherein the clamping claw is fixed on the supporting tool with a clamping screw, and
a pressure piece arranged on the clamping claw which comprises a cam on the underside facing the cutting plate which is in contact with the clamping trough, wherein the clamping claw pulls the pressure piece in the direction of the clamping screw, wherein the clamping trough is formed in a circular shape and in the center has a spherical or circular elevation, arid wherein the cam comprises a circular ring that is adapted thereto and tightly engages into the clamping trough while surrounding the elevation, wherein the pressure piece is secured to the clamping claw with clearance by way of a screw.

2. A metal-cutting tool comprising
a supporting tool which has a recess to accommodate a cutting insert comprising a clamping trough held in the supporting tool by a clamping claw, wherein the clamping claw is fixed on the supporting tool with a clamping screw, and
a pressure piece arranged on the clamping claw which comprises a cam on the underside facing the cutting plate which is in contact with the clamping trough, wherein the clamping claw pulls the pressure piece in the direction of the clamping screw, wherein the clamping trough is formed in a circular shape and in the center has a spherical or circular elevation, and wherein the cam comprises a circular ring that is adapted thereto and tightly engages into the clamping trough while surrounding the elevation, wherein an open region centrically or concentrically surrounds a ring on the pressure piece, and wherein the open region is centrically or concentrically surrounded by a bearing surface that rises towards the center of the ring at an angle.

3. A metal-cutting tool comprising
a supporting tool which has a recess to accommodate a cutting insert comprising a clamping trough held in the supporting tool by a clamping claw, wherein the clamping claw is fixed on the supporting tool with a clamping screw, and
a pressure piece arranged on the clamping claw which comprises a cam on the underside facing the cutting plate which is in contact with the clamping trough, wherein the clamping claw pulls the pressure piece in the direction of the clamping screw, wherein the clamping trough is formed in a circular shape and in the center has a spherical or circular elevation, wherein the cam comprises a circular ring that is adapted thereto and tightly engages into the clamping trough while surrounding the elevation, wherein the clamping claw is guided on the supporting tool by two inclines, with the two inclines extending in parallel and being separated from each other by a slit, and wherein the two inclines have a cylindrical surface, and the supporting tool has cylindrical lateral surfaces adapted thereto.

4. A metal-cutting tool comprising
a supporting tool which has a recess to accommodate a cutting insert comprising a clamping trough held in the supporting tool by a clamping claw, wherein the clamping claw is fixed on the supporting tool with a clamping screw, and
a pressure piece arranged on the clamping claw which comprises a cam on the underside facing the cutting plate which is in contact with the clamping trough, wherein the clamping claw pulls the pressure piece in the direction of the clamping screw, wherein the clamping trough is formed in a circular shape and in the center has a spherical or circular elevation, and wherein the cam comprises a circular ring that is adapted thereto and tightly engages into the clamping trough while surrounding the elevation, wherein the two inclines extend at an angle of 10° to 45° in relation to a longitudinal axis of the clamping claw, and wherein the two inclines have a cylindrical surface, and the supporting tool has cylindrical lateral surfaces adapted thereto.

* * * * *